US010280976B2

(12) United States Patent
Minami et al.

(10) Patent No.: US 10,280,976 B2
(45) Date of Patent: May 7, 2019

(54) BELLOWS SUPPORT STRUCTURE AND SLIDE TABLE DEVICE

(71) Applicant: FANUC CORPORATION, Yamanashi (JP)

(72) Inventors: Hiroshi Minami, Yamanashi-ken (JP); Masahiro Murota, Yamanashi-ken (JP); Yuuta Hayakawa, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/693,993

(22) Filed: Sep. 1, 2017

(65) Prior Publication Data

US 2018/0066701 A1    Mar. 8, 2018

(30) Foreign Application Priority Data

Sep. 5, 2016 (JP) .................................. 2016-173096

(51) Int. Cl.
| | | |
|---|---|---|
| *F16C 29/00* | (2006.01) | |
| *F16C 29/02* | (2006.01) | |
| *F16C 41/00* | (2006.01) | |
| *F16J 3/04* | (2006.01) | |

(52) U.S. Cl.
CPC .......... *F16C 29/025* (2013.01); *F16C 29/007* (2013.01); *F16C 41/005* (2013.01); *F16J 3/048* (2013.01); *F16C 2322/00* (2013.01); *F16C 2370/00* (2013.01)

(58) Field of Classification Search
CPC ...... F16C 29/007; F16C 29/02; F16C 29/025; F16C 33/10; F16C 33/1005; F16C 33/1025; F16C 33/103; F16C 33/105; F16C 41/005; F16J 3/04; F16J 3/048

USPC ............................................................ 384/15
See application file for complete search history.

(56) References Cited

U.S. PATENT DOCUMENTS 6,296,413 B1 * 10/2001 McCann ................. F16C 29/08
        384/15
6,431,249 B1    8/2002 Tabellini

FOREIGN PATENT DOCUMENTS

| JP | 52139769 U | 10/1977 |
|---|---|---|
| JP | 5773051 U | 5/1982 |
| JP | 6034572 A | 2/1985 |
| JP | 4102773 U | 9/1992 |
| JP | 578437 U | 10/1993 |
| JP | 7156039 A | 6/1995 |
| JP | 9271976 A | 10/1997 |

(Continued)

OTHER PUBLICATIONS

English Abstract and Machine Translation for Japanese Publication No. 5211542 B2, published Mar. 8, 2013, 6 pgs.

(Continued)

*Primary Examiner* — James Pilkington
(74) *Attorney, Agent, or Firm* — Fredrikson & Byron, P.A.

(57) ABSTRACT

A support structure for a bellows attached to a slide table, and which is capable of expanding and contracting in a movement direction of the slide table, includes support members that support the bellows, shafts disposed substantially in parallel with the movement direction of the slide table, and bushes that support the support member so as to be capable of moving in the movement direction of the slide table with respect to the shafts. Fluid bearings are formed by supplying a fluid between the bushes and the shafts.

2 Claims, 5 Drawing Sheets

(56) References Cited

FOREIGN PATENT DOCUMENTS

| JP | 2000130582 A | 5/2000 |
|---|---|---|
| JP | 2000271834 A | 10/2000 |
| JP | 2003311580 A | 11/2003 |
| JP | 2008264888 A | 11/2008 |
| JP | 2009107081 A | 5/2009 |
| JP | 2010553 A | 1/2010 |
| JP | 5211542 B2 | 3/2013 |
| JP | 2015107528 A | 6/2015 |
| JP | 2015107529 A | 6/2015 |

OTHER PUBLICATIONS

English Abstract and Machine Translation for Japanese Publication No. 07-156039 A, published Jun. 20, 1995, 6 pgs.

English Abstract and Machine Translation for Japanese Publication No. 2000-271834 A, published Oct. 3, 2000, 8 pgs.

English Machine Translation for Japanese Publication No. JPS52-139769 U, published Oct. 22, 1977, 6 pgs.

English Abstract and Machine Translation for Japanese Publication No. 60-034572 A, published Feb. 22, 1985, 4 pgs.

English Machine Translation for Japanese Publication No. JPS57-073051 U, published May 6, 1982, 6 pgs.

English Abstract and Machine Translation for Japanese Publication No. 2008-264888 A, published Nov. 6, 2008, 14 pgs.

English Abstract and Machine Translation for Japanese Publication No. 2015-107528 A, published Jun. 11, 2015, 10 pgs.

English Abstract and Machine Translation for Japanese Publication No. 2015-107529 A, published Jun. 11, 2015, 12 pgs.

English Abstract and Machine Translation for Japanese Publication No. 2000-130582 A, published May 12, 2000, 13 pgs.

English Abstract and Machine Translation for Japanese Publication No. 2010-000553 A, published Jan. 7, 2010, 12 pgs.

English Abstract and Machine Translation for Japanese Publication No. 09-271976 A, published Oct. 21, 1997, 8 pgs.

English Abstract and Machine Translation for Japanese Publication No. 2003-311580 A, published Nov. 5, 2003, 16 pgs.

English Machine Translation for Japanese Publication No. JPH04-102773 U, published Sep. 4, 1992, 8 pgs.

English Abstract and Machine Translation for Japanese Publication No. 2009-107081 A, published May 21, 2009, 11 pgs.

English Machine Translation for Japanese Publication No. 05-078437 U, published Oct. 26, 1993, 9 pgs.

\* cited by examiner

BELLOWS SUPPORT STRUCTURE AND SLIDE TABLE DEVICE

CROSS-REFERENCE TO RELATED APPLICATION

This application is based upon and claims the benefit of priority from Japanese Patent Application No. 2016-173096 filed on Sep. 5, 2016, the contents of which are incorporated herein by reference.

BACKGROUND OF THE INVENTION

Field of the Invention

The present invention relates to a bellows support structure and a slide table device.

Description of the Related Art

In a machine tool or a measuring machine or the like, in order to prevent a coolant, chips, or floating foreign matter from entering into a guide for guiding a slide table, the guide is covered by a bellows, which expands and contracts together with movement of the slide table. The bellows is bent easily, and if the bellows becomes bent, the bellows cannot expand and contract smoothly. In order to suppress bending of the bellows, the following techniques have been disclosed.

In Japanese Laid-Open Patent Publication No. 07-156039, it is disclosed that a guide plate is attached at an intermediate position of a bellows, whereby bending of the bellows is suppressed. The bellows can be moved lightly by movement of rollers of the guide plate on a bellows guide.

In Japanese Patent No. 5211542, a configuration is disclosed in which a bellows supporting member is provided to which a bellows is fixed. A bellows support plate that supports the bellows supporting member is levitated with respect to a guide rail by air being blown out from a porous plate material, which is arranged on a base of the guide rail, so as to support the bellows support plate in the air in a non-contact manner.

SUMMARY OF THE INVENTION

However, according to the technique disclosed in Japanese Laid-Open Patent Publication No. 07-156039, since the bellows guide and the rollers are in contact with each other, friction is generated between the bellows guide and the rollers. There is a concern that such friction between the bellows guide and the rollers may reduce the movement accuracy during movement of the slide table.

Further, with the technique disclosed in Japanese Patent No. 5211542, in the case that foreign matter becomes placed on the porous plate material, there is a concern that the bellows support plate may undergo vibrations when the bellows support plate rides over such foreign matter. There is further a concern that such vibrations of the bellows support plate may reduce the movement accuracy of the slide table.

The present invention has been devised in order to solve the aforementioned problems, and has the object of providing a bellows support structure and a slide table device, which are capable of improving the movement accuracy of the slide table.

According to a first invention, a support structure for a bellows attached to a slide table, and which is capable of expanding and contracting in a movement direction of the slide table, comprises a support member adapted to support the bellows, a shaft disposed substantially in parallel with the movement direction of the slide table, and a bush adapted to support the support member in a manner that the support member is capable of moving in the movement direction of the slide table with respect to the shaft, wherein a fluid bearing is formed by supplying a fluid between the bush and the shaft. In accordance with the above support structure, friction between the shaft and the bush can be reduced by the fluid bearing. Therefore, the movement accuracy of the slide table can be improved.

In the first invention, an oil bearing may be formed by supplying hydraulic oil between the slide table and a guide adapted to guide the slide table, and the fluid bearing may be formed by supplying between the shaft and the bush the same hydraulic oil as the hydraulic oil that is supplied between the slide table and the guide. In accordance with this feature, since the hydraulic oil which is supplied between the slide table and the guide, and the hydraulic oil which is supplied between the shaft and the bush are the same, a fluid supplying unit for supplying the hydraulic oil can be used in common, and together therewith, a fluid recovery unit for collecting the hydraulic oil can be used in common. Thus, it is possible to simplify the configuration of the fluid supplying unit and the fluid recovery unit.

According to a second invention, a slide table device having a support structure for a bellows attached to a slide table, and which is capable of expanding and contracting in a movement direction of the slide table, comprises a fluid supplying unit adapted to supply a fluid between a shaft and a bush, a flow rate detection unit adapted to detect a flow rate of the fluid supplied between the shaft and the bush, and a load estimating unit adapted to estimate a load that acts on the bellows depending on the flow rate of the fluid. In accordance with the above slide table device, it is possible to estimate the amount of deposited material that is deposited on the bellows.

According to the present invention, it is possible to improve the movement accuracy of the slide table.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of a support structure for a bellows 12 and a slide table device 10 according to the present invention will be described in detail below with reference to the accompanying drawings.

Embodiment 1

[Configuration of Slide Table Device]

Figure 1:
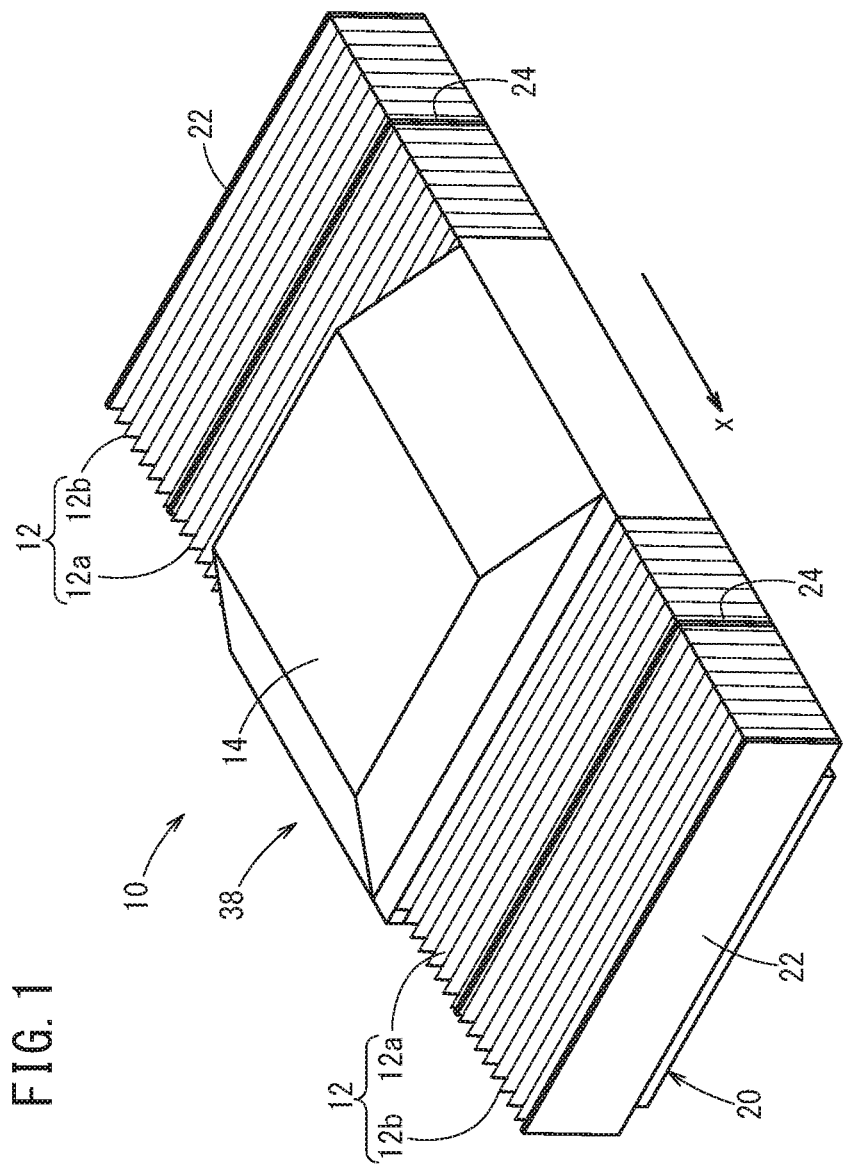
FIG. 1 is a schematic diagram of a slide table device according to an Embodiment 1.
Figure 2:
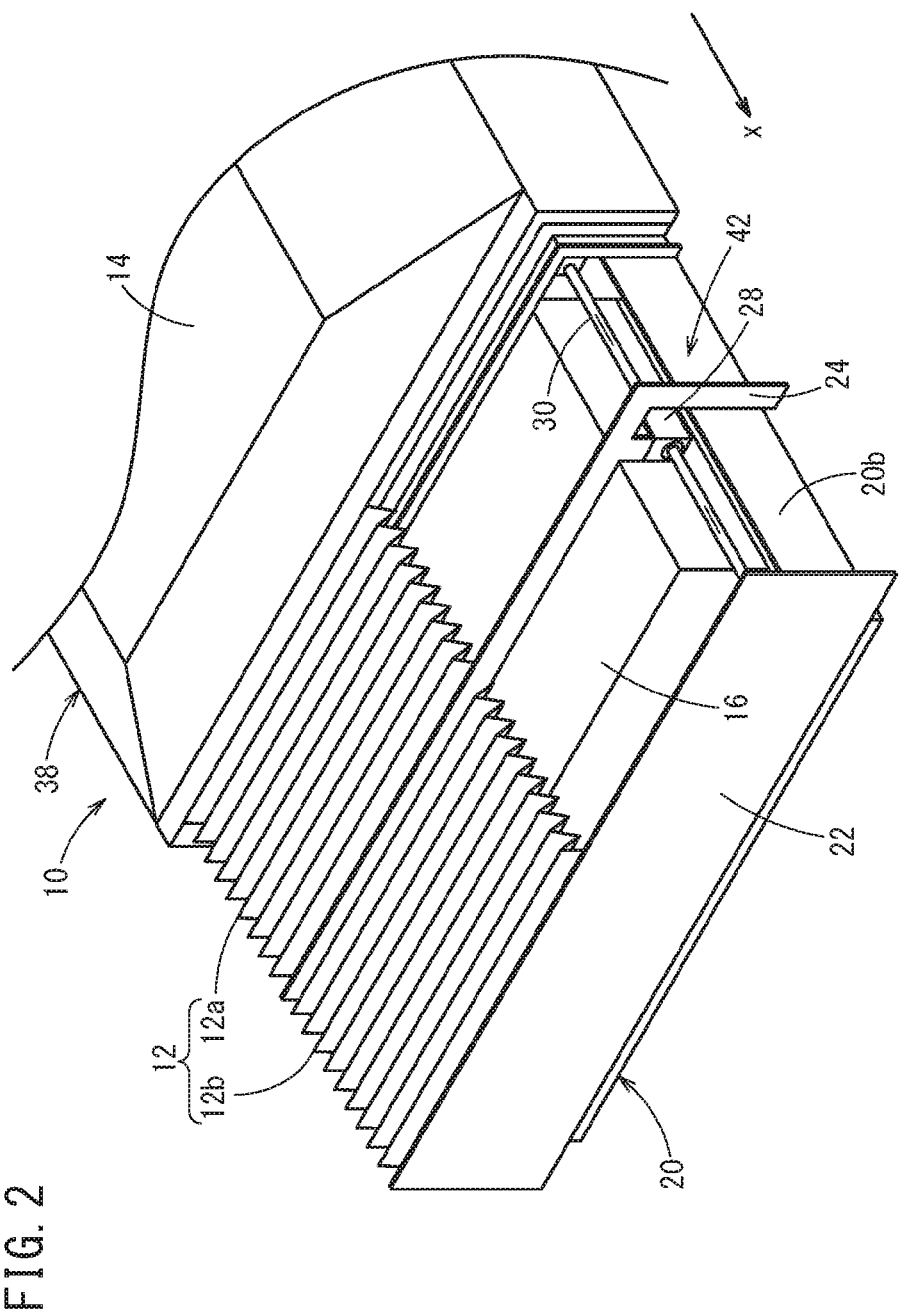
FIG. 2 is a schematic diagram showing a state in which a portion of a bellows of the slide table device according to Embodiment 1 is cut away.
Figure 3:
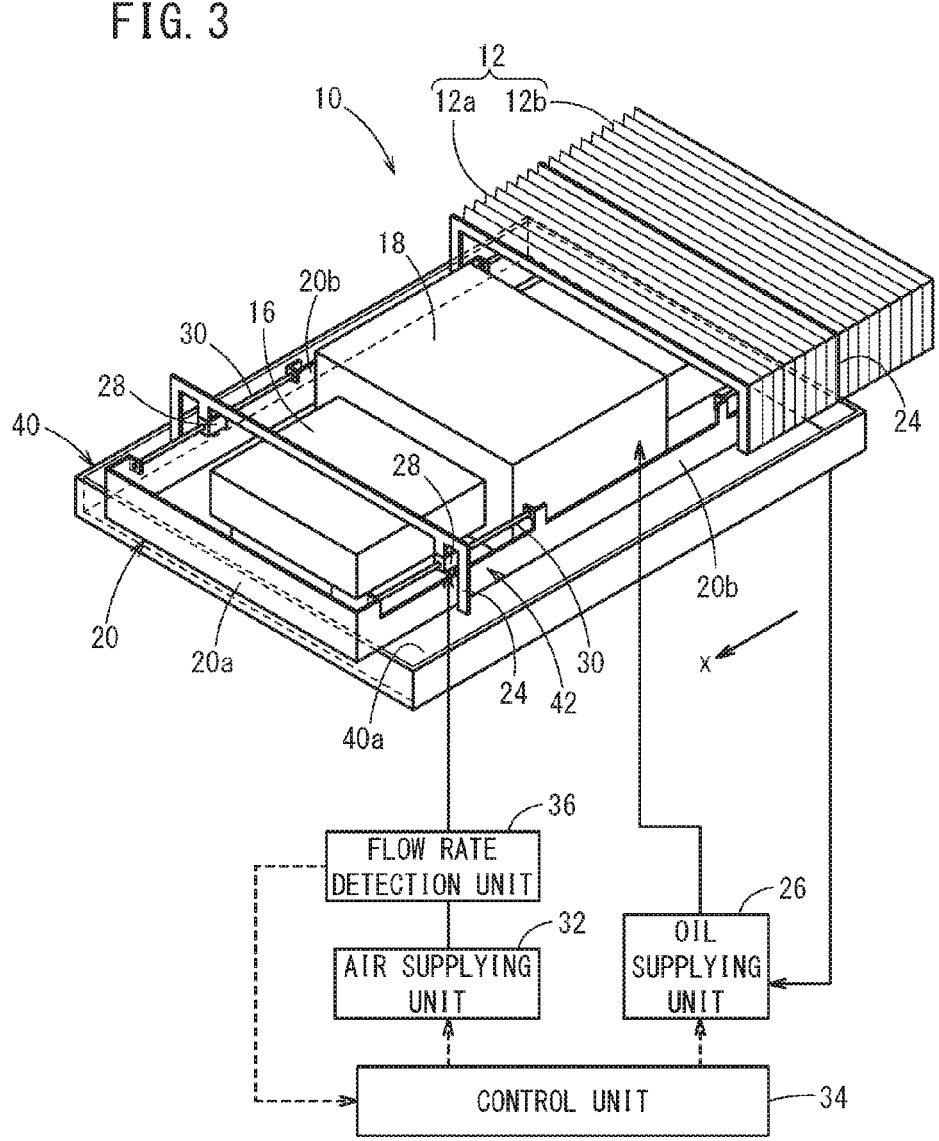
FIG. 3 is a schematic view showing a state in which a table and a portion of the bellows are removed from the slide table device according to Embodiment 1.
Figure 4:
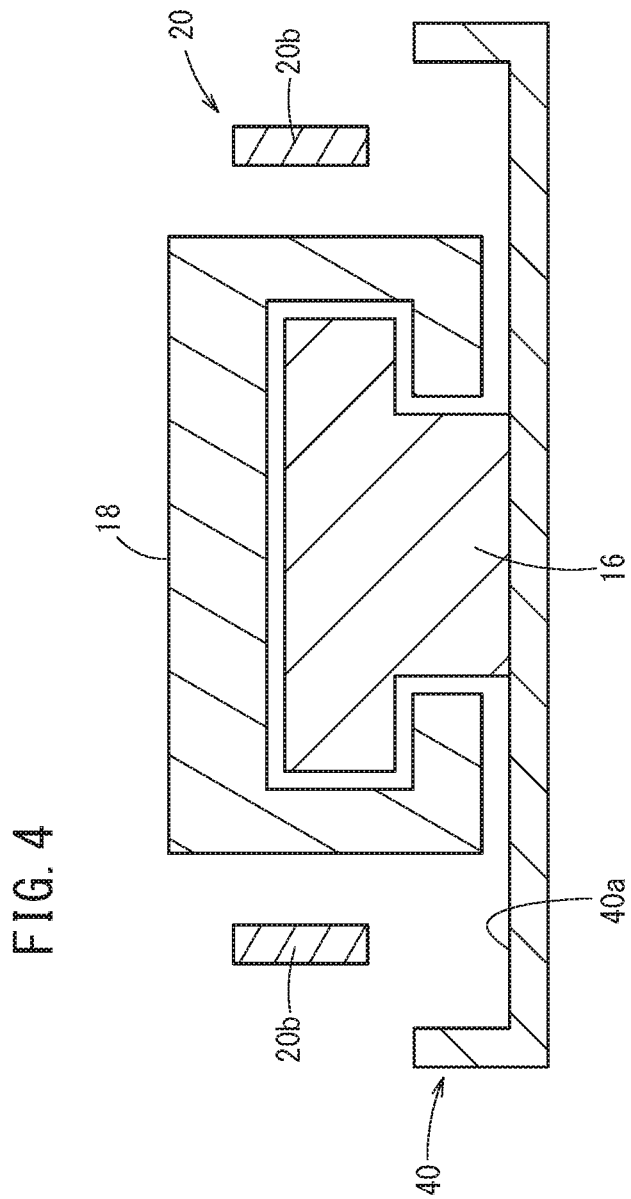
FIG. 4 is a schematic cross-sectional view of a guide and a slide of the slide table device according to Embodiment 1.

FIG. 1 is a schematic diagram of a slide table device 10. FIG. 2 is a schematic diagram showing a state in which a portion of a bellows 12 of the slide table device 10 is cut away. FIG. 3 is a schematic view showing a state in which a table 14 and a portion of the bellows 12 are removed from the slide table device 10. FIG. 4 is a schematic cross-sectional view of a guide 16 and a slide 18 of the slide table device 10.

The slide table device 10 is used in a machine tool, a measuring machine, or the like. An object to be machined, an object to be measured, or the like, are fixed to the table 14 of the slide table device 10. The table 14 is disposed so as to be capable of moving in the x-axis direction of FIG. 1. Respective bellows 12 are provided on both sides of the movement direction of the table 14 (on the x-axis positive direction side and the x-axis negative direction side). The bellows 12 can expand and contract in the x-axis direction in accordance with movement of the table 14 in the x-axis direction. The respective bellows 12 cover a driving device for moving the table 14, and prevent coolant and chips, as well as suspended foreign matter and the like from entering inside the bellows 12.

The slide table device 10 includes the table 14, the slide 18, the guide 16, and an oil pan 40. The oil pan 40 is formed in a box-like shape with an opening at the top. The guide 16 is fixed to a bottom part 40a of the oil pan 40 (see FIGS. 3 and 4). The guide 16 is formed to extend in the x-axis direction. When the guide 16 is viewed from the x-axis direction, a cross-section of the guide 16 is formed substantially in a T-shape (see FIG. 4). A slide 18 is disposed above the guide 16. When the slide 18 is viewed from the x-axis direction, the slide 18 is disposed in a straddling manner over an upper part of the guide 16 (see FIG. 4). The slide 18 is driven by a non-illustrated driving device along the guide 16 in an x-axis positive direction and an x-axis negative direction. The table 14 is supported on the slide 18. The table 14 moves integrally with the slide 18 in the x-axis positive direction and the x-axis negative direction. The table 14 and the slide 18 constitute a slide table 38.

A support frame 20 is provided so as to cover the entire periphery around the outer sides of the guide 16 and the slide 18 (see FIG. 3). The support frame 20 is formed in a rectangular shape opening upwardly and downwardly. The support frame 20 is disposed above the oil pan 40 (see FIG. 4). The support frame 20 is fixed to the oil pan 40 via a non-illustrated support structure. The support frame 20 has side surfaces 20a facing toward each other in a longitudinal direction of the support frame 20, and side surfaces 20b facing toward each other in a lateral direction of the support frame 20.

The table 14 is disposed so as to straddle over the outer sides of the side surfaces 20b of the support frame 20 (see FIG. 2). The bellows 12 are also disposed so as to straddle over the outer sides of the side surfaces 20b of the support frame 20 (see FIG. 3). Ends on opposite sides of the bellows 12 with respect to the table 14 are attached to fixing plates 22, which are fixed to surfaces on outer sides of the side surfaces 20a of the support frame 20 (see FIG. 2). Owing thereto, the outer sides of the side surfaces 20a and the side surfaces 20b of the support frame 20, and an upwardly opening portion of the support frame 20 are covered respectively by the bellows 12, the table 14, and the fixing plates 22.

Each of the bellows 12 has a first bellows section 12a and a second bellows section 12b. The first bellows sections 12a are provided on sides near to the table 14, and the second bellows sections 12b are provided on sides far from the table 14. The table 14 sides of the first bellows sections 12a are fixed to the side surfaces of the table 14. Support members 24 are provided between the first bellows section 12a and the second bellows sections 12b. The support members 24 are disposed so as to straddle over the outer sides of the side surfaces 20b of the support frame 20 (see FIGS. 2 and 3). The support member 24 sides of the first bellows sections 12a and the second bellows sections 12b are fixed respectively to the support members 24. The fixing plate 22 sides of the second bellows sections 12b are fixed to the fixing plates 22.

[Slide Support Structure]

A gap is formed between the guide 16 and the slide 18 (see FIG. 4). Hydraulic oil is supplied into such a gap by an oil supplying unit 26. The oil supplying unit 26 is controlled by a control unit 34, and supplies hydraulic oil into the gap at a constant pressure between the guide 16 and the slide 18. Consequently, an oil bearing is formed between the guide 16 and the slide 18, and the slide 18 is kept in a floating state with respect to the guide 16. Since the guide 16 and the slide 18 do not directly contact each other, friction between the guide 16 and the slide 18 is only due to viscous resistance of the hydraulic oil. Therefore, friction between the guide 16 and the slide 18 is greatly reduced in comparison with friction between the guide 16 and the slide 18 in the event that rollers or the like are disposed between the guide 16 and the slide 18. The oil supplying unit 26 is constituted from a strainer for filtering the hydraulic oil, and a pump for delivering the hydraulic oil, and the like. The oil supplying unit 26 draws in the hydraulic oil stored in the oil pan 40, and supplies the hydraulic oil to the gap between the guide 16 and the slide 18. The hydraulic oil flowing out from the gap between the guide 16 and the slide 18 is recirculated back to the oil pan 40 and is stored therein.

[Support Structure of Supporting Members]

Shafts 30 are fixed to the support frame 20 and extend in the longitudinal direction (x-axis direction) of the support frame 20. The shafts 30 are disposed substantially in parallel to the direction of movement of the slide table 38 (table 14). The shafts 30 are arranged on inner sides of the side surfaces 20b (see FIGS. 2 and 3). Bushes 28 are disposed on the shafts 30 so as to be capable of moving in the x-axis direction. The shafts 30 are inserted into penetrating holes formed in each of the bushes 28. The support members 24 are fixed to the bushes 28. The bushes 28 move along the shafts 30 in the x-axis direction together with the support members 24.

Air (fluid) is supplied by an air supplying unit (fluid supplying unit) 32 between the bushes 28 and the shafts 30. The air supplying unit 32 is controlled by the control unit 34, and supplies air at a constant pressure between the bushes 28 and the shafts 30. Consequently, air bearings (fluid bearings) are formed between the bushes 28 and the shafts 30, and the bushes 28 are kept in a floating state with respect to the shafts 30. Since the bushes 28 and the shafts 30 do not directly contact each other, friction between the bushes 28 and the shafts 30 is only due to viscous resistance of the air. Therefore, friction between the bushes 28 and the shafts 30 is greatly reduced in comparison with friction between the bushes 28 and the shafts 30 in the event that the bushes 28 and the shafts 30 are in contact with each other. The air supplying unit 32 is constituted from a filter that removes dust and the like contained within the drawn-in air, and a pump for delivering the air, and the like. Further, a support structure 42 is constituted by the support members 24, the bushes 28, the shafts 30, and the fluid bearings that are formed between the bushes 28 and the shafts 30.

[Estimation of Load on Bellows]

When coolant, chips, etc., become deposited on the bellows 12, a load that acts on the bellows 12 in the direction of gravity increases. According to the present embodiment, a flow rate detection unit 36 is provided, which detects the flow rate of air that is supplied from the air supplying unit 32 between the bushes 28 and the shafts 30, and the load acting on the bellows 12 is estimated by the control unit 34 from the air flow rate. The control unit 34 corresponds to a load estimating unit of the present invention.

Figure 5A:
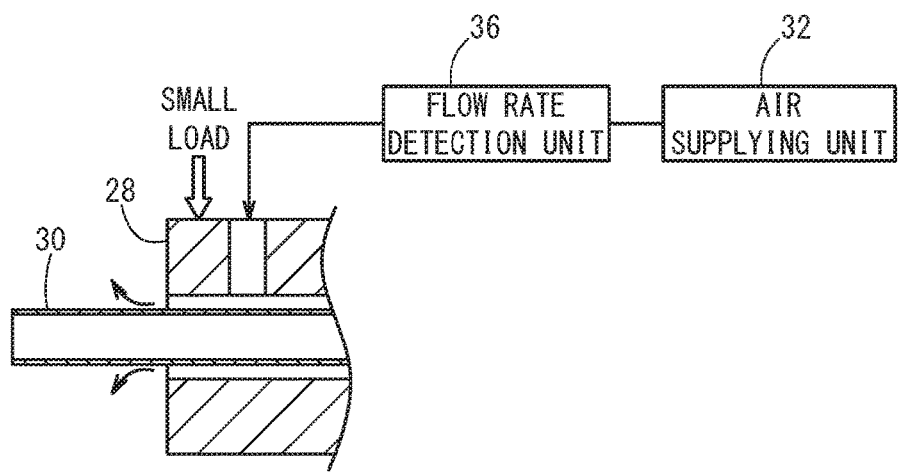
FIG. 5A is a schematic diagram showing a positional relationship between a shaft and a through hole of a bush, in the case that a load that acts on the bellows of Embodiment 1 is small.
Figure 5B:
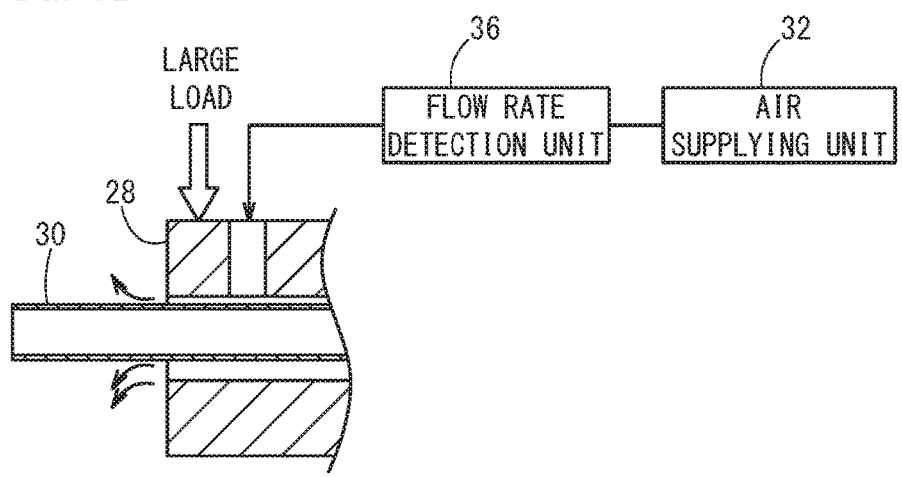
FIG. 5B is a schematic diagram showing a positional relationship between a shaft and a through hole of a bush, in the case that a load that acts on the bellows of Embodiment 1 is large.

FIGS. 5A and 5B are schematic diagrams showing a positional relationship between the shafts 30 and the penetrating holes of the bushes 28. FIG. 5A is a schematic diagram showing a case in which the load acting on the bellows 12 is small. FIG. 5B is a schematic diagram showing a case in which the load acting on the bellows 12 is large.

The air supplying unit 32 supplies air at a constant pressure between the bushes 28 and the shafts 30. Therefore, in the case that the load acting on the bellows 12 is large (see FIG. 5B), the position of the bushes 28 relative to the shafts 30 is lower in comparison with the position of the bushes 28 relative to the shafts 30 in the case that the load is small (see FIG. 5A). For this reason, among the flow paths of air formed between the penetrating holes of the bushes 28 and the shafts 30, the gap of the upper flow path with respect to the shafts 30 becomes smaller as the load that acts on the bellows 12 is larger. Further, among the flow paths of air formed between the penetrating holes of the bushes 28 and the shafts 30, the gap of the lower flow path with respect to the shafts 30 becomes larger as the load that acts on the bellows 12 is larger. Therefore, the flow rate of air flowing through the lower flow path with respect to the shafts 30 increases, and the flow rate of air supplied from the air supplying unit 32 between the bushes 28 and the shafts 30 increases. In accordance with this phenomenon, the control unit 34 monitors the flow rate of air that is supplied from the air supplying unit 32 between the bushes 28 and the shafts 30, and depending on the air flow rate, is capable of estimating the load that acts on the bellows 12.

[Operations and Effects]

The support members 24, which are adapted to support the bellows 12, are provided in order to suppress deflection of the bellows 12. Since the support members 24 move following expansion and contraction of the bellows 12, if movement of the support members 24 is hindered, the bellows 12 cannot be smoothly expanded and contracted. Therefore, there is a concern that the movement accuracy of the slide table 38 (table 14) to which the bellows 12 are attached may be decreased.

Thus, according to the present embodiment, the support members 24 are supported by the bushes 28 with respect to the shafts 30 that are provided in the support frame 20. Furthermore, air is supplied between the bushes 28 and the shafts 30 by the air supplying unit 32, whereby the fluid bearings are formed between the bushes 28 and the shafts 30.

Consequently, friction between the bushes 28 and the shafts 30 can be reduced. Thus, the respective bellows 12 can be smoothly expanded and contracted, and it is possible to improve the movement accuracy of the slide table 38.

Coolant and chips, etc., are deposited on the bellows 12. If the load acting on the bellows 12 increases due to deposited material on the bellows 12, the bellows 12 may become deflected, and there is a concern that the movement accuracy of the slide table 38 may be reduced.

Thus, according to the present embodiment, the flow rate detection unit 36 detects the flow rate of air that is supplied between the bushes 28 and the shafts 30, and the load acting on the bellows 12 is estimated in the control unit 34 from the air flow rate.

Consequently, it is possible to estimate the load acting on the bellows 12 without using a separately provided measuring instrument or the like for measuring the load of any deposited material on the bellows 12. In the case that the load acting on the bellows 12 becomes greater than or equal to the predetermined load, for example, a guidance instruction to remove such deposited material can be notified to the operator.

Embodiment 2

A slide table device 10 according to an Embodiment 2 will now be described. The same constituent elements as those of the slide table device 10 according to Embodiment 1 are denoted with the same reference numerals, and description of such features is omitted. According to Embodiment 1, air is supplied between the bushes 28 and the shafts 30, whereby the fluid bearings are formed between the bushes 28 and the shafts 30. As a modification to this configuration, according to Embodiment 2, hydraulic oil is supplied between the bushes 28 and the shafts 30, whereby the fluid bearings are formed between the bushes 28 and the shafts 30.

According to Embodiment 2, the air supplying unit 32 of the first embodiment is eliminated, and hydraulic oil is supplied by the oil supplying unit 26 between the bushes 28 and the shafts 30. Hydraulic oil flowing out from between the bushes 28 and the shafts 30 is recovered in the oil pan 40. The hydraulic oil that is supplied between the bushes 28 and the shafts 30 is the same as the hydraulic oil that is supplied between the guide 16 and the slide 18.

Operations and Effects

According to Embodiment 2, the same hydraulic oil as the hydraulic oil that is supplied between the guide 16 and the slide 18 is supplied between the bushes 28 and the shafts 30, whereby the fluid bearings are formed between the bushes 28 and the shafts 30. Consequently, by using the oil supplying unit 26 that supplies the hydraulic oil between the guide 16 and the slide 18, it is possible to also supply the hydraulic oil between the bushes 28 and the shafts 30. Further, by using the oil pan 40 through which the hydraulic oil flowing out from between the guide 16 and the slide 18 is recovered, it is possible to recover the hydraulic oil that flows out from between the bushes 28 and the shafts 30. Thus, it is possible to simplify the structures of the mechanism for supplying the hydraulic oil as well as the mechanism for recovering the hydraulic oil.

Other Embodiments

Although the present invention has been described based on Embodiment 1 and Embodiment 2, the specific configurations of the respective inventions are not limited to Embodiment 1 and Embodiment 2, and even if design changes or the like are made within a scope that does not depart from the essence and gist of the present invention, such changes are included within the present invention.

According to Embodiment 1 and Embodiment 2, one support member 24 is provided for one bellows 12. However, in such a configuration, a plurality of support members 24 may be provided for one bellows 12. Further, in Embodiment 1 and Embodiment 2, the table 14 and the slide 18 are formed separately, however, the table 14 and the slide 18 may be formed in an integral manner to thereby make up the slide table 38.

According to Embodiment 2, hydraulic oil is supplied by the oil supplying unit 26 between the bushes 28 and the shafts 30, as well as between the guide 16 and the slide 18. As a modification to this configuration, a mechanism for supplying hydraulic oil between the bushes 28 and the shafts 30 may be provided separately from the oil supplying unit 26.

What is claimed is:

1. A device having a slide table and a support structure for a bellows, wherein the bellows is capable of expanding and contracting in a movement direction of the slide table, comprising:

a support member adapted to support the bellows;

a shaft disposed substantially in parallel with the movement direction of the slide table;

a bush adapted to support the support member in a manner that the support member is capable of moving in the movement direction of the slide table with respect to the shaft, wherein a fluid bearing is formed by supplying a fluid between the bush and the shaft; an oil bearing is formed by supplying hydraulic oil between the slide table and a guide adapted to guide the slide table; and the fluid bearing is formed by supplying between the shaft and the bush the same hydraulic oil as the hydraulic oil that is supplied between the slide table and the guide.

2. A slide table device having a support structure for a bellows according to claim 1, comprising:

a fluid supplying unit adapted to supply the fluid between the shaft and the bush;

a flow rate detection unit adapted to detect a flow rate of the fluid supplied between the shaft and the bush; and a load estimating unit adapted to estimate a load that acts on the bellows depending on the flow rate of the fluid.

* * * * *